E. H. LICHTENBERG.
PORTABLE CONVEYER.
APPLICATION FILED MAR. 28, 1918.
1,273,886.
Patented July 30, 1918.
4 SHEETS—SHEET 1.
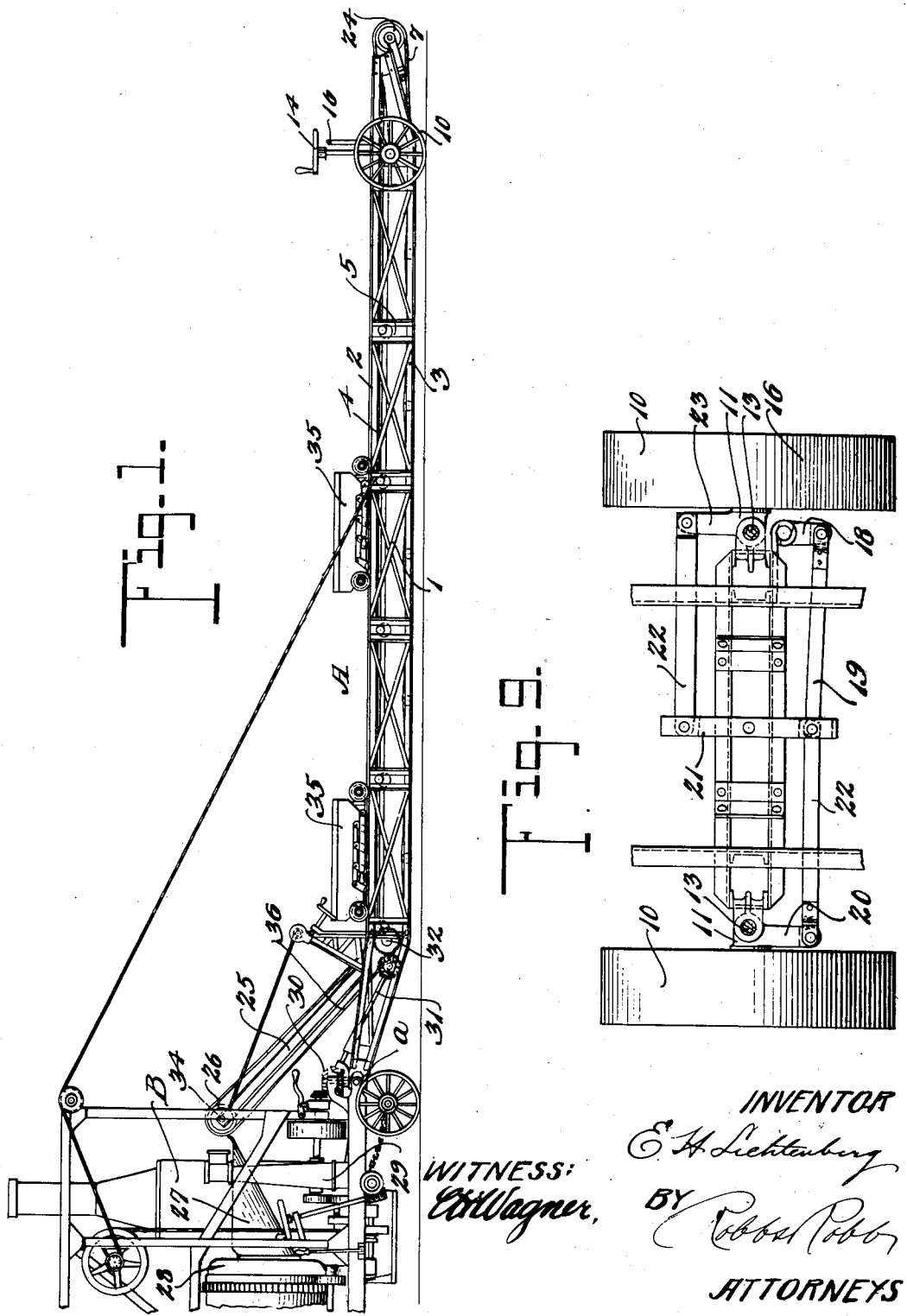

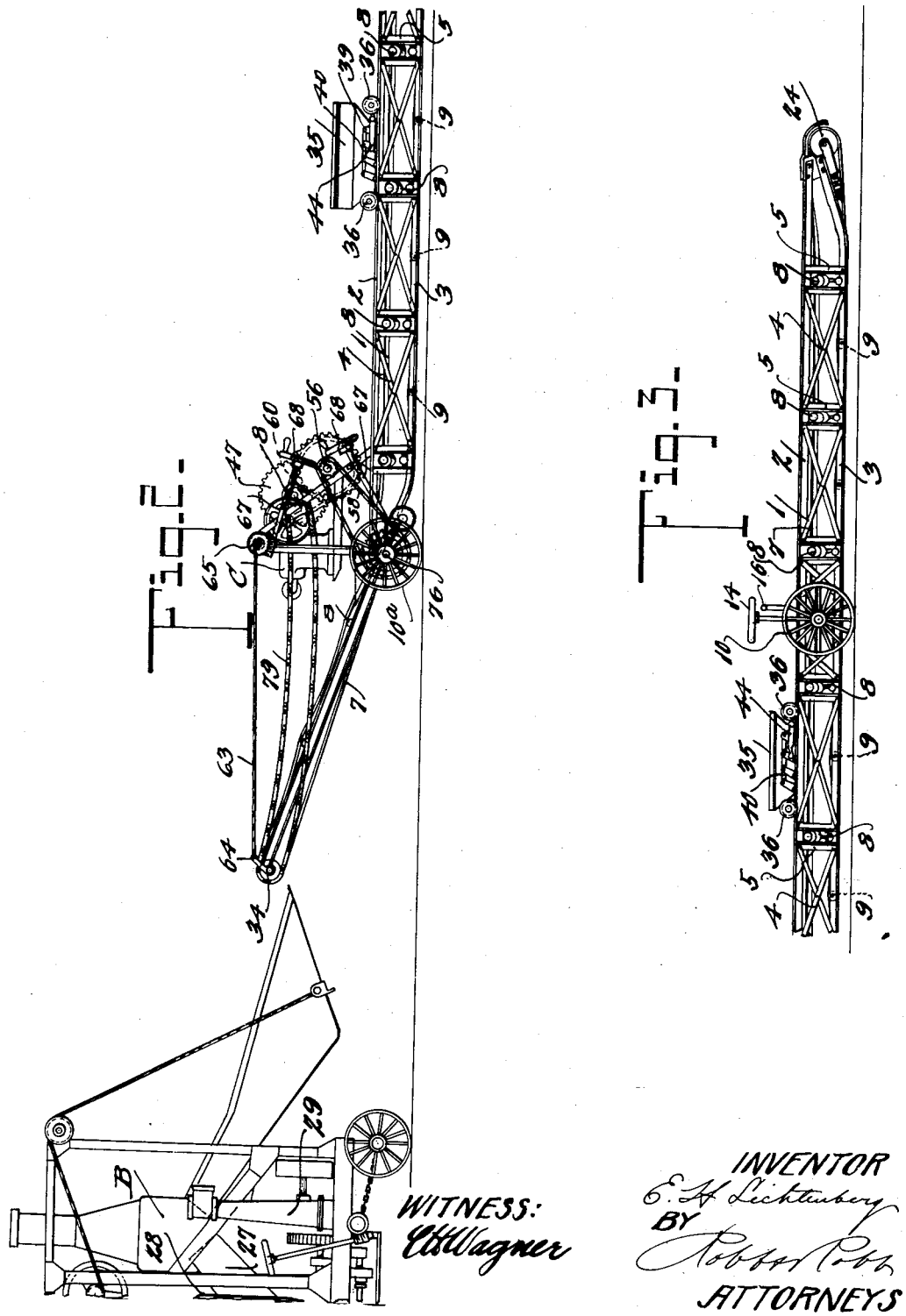

E. H. LICHTENBERG.
PORTABLE CONVEYER.
APPLICATION FILED MAR. 28, 1918.
1,273,886.
Patented July 30, 1918.
4 SHEETS—SHEET 3.
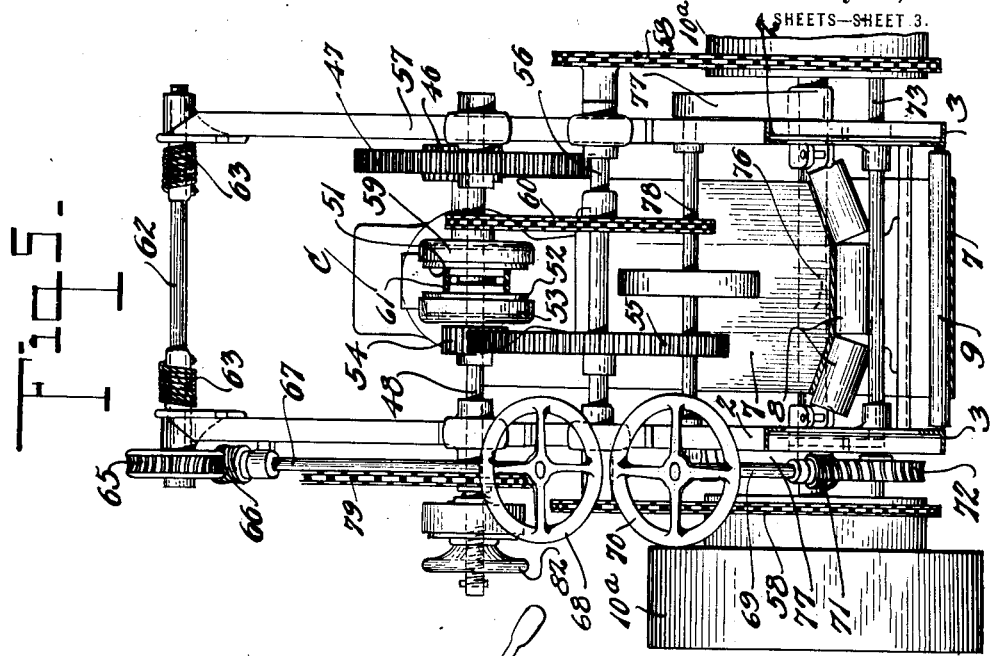
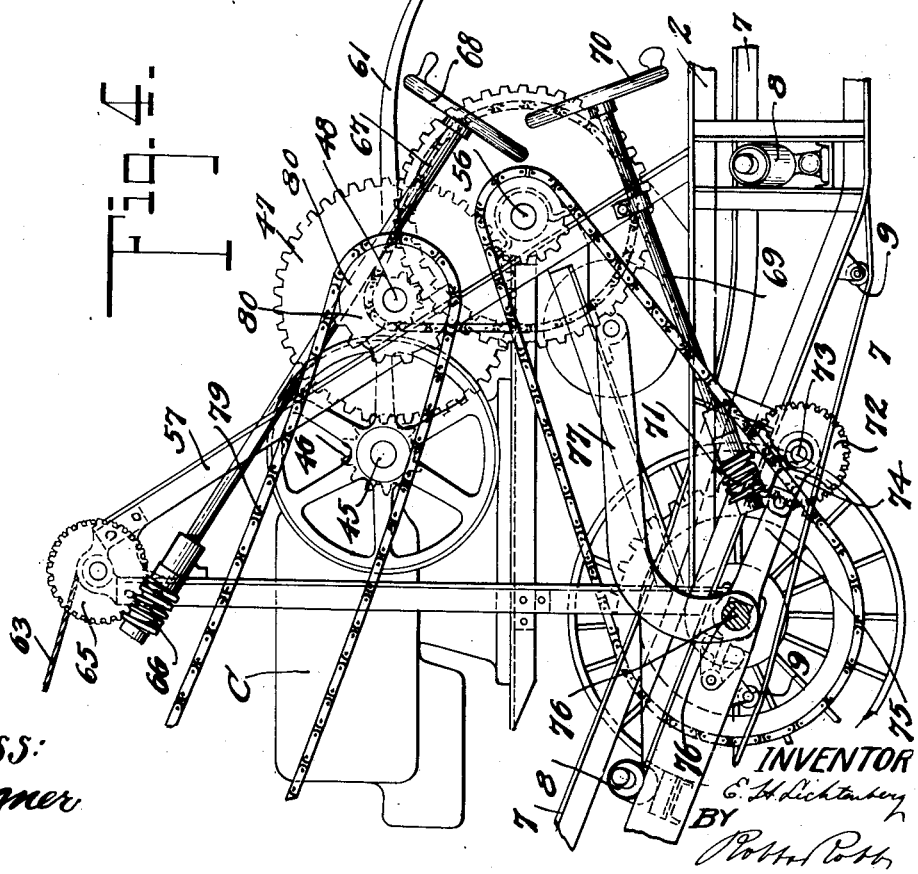
WITNESS:
E. W. Wagner
INVENTOR
E. H. Lichtenberg
BY
Robert Roth
ATTORNEYS E. H. LICHTENBERG.
PORTABLE CONVEYER.
APPLICATION FILED MAR. 28, 1918.
1,273,886.
Patented July 30, 1918.
4 SHEETS—SHEET 4.
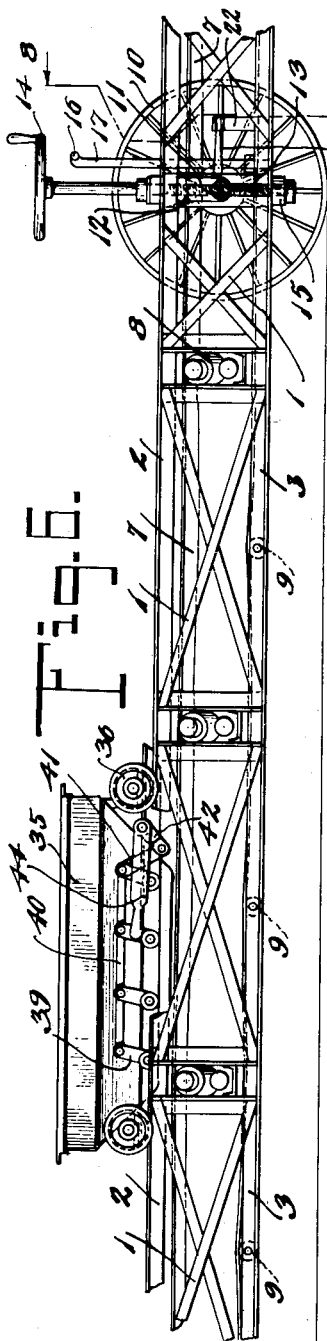
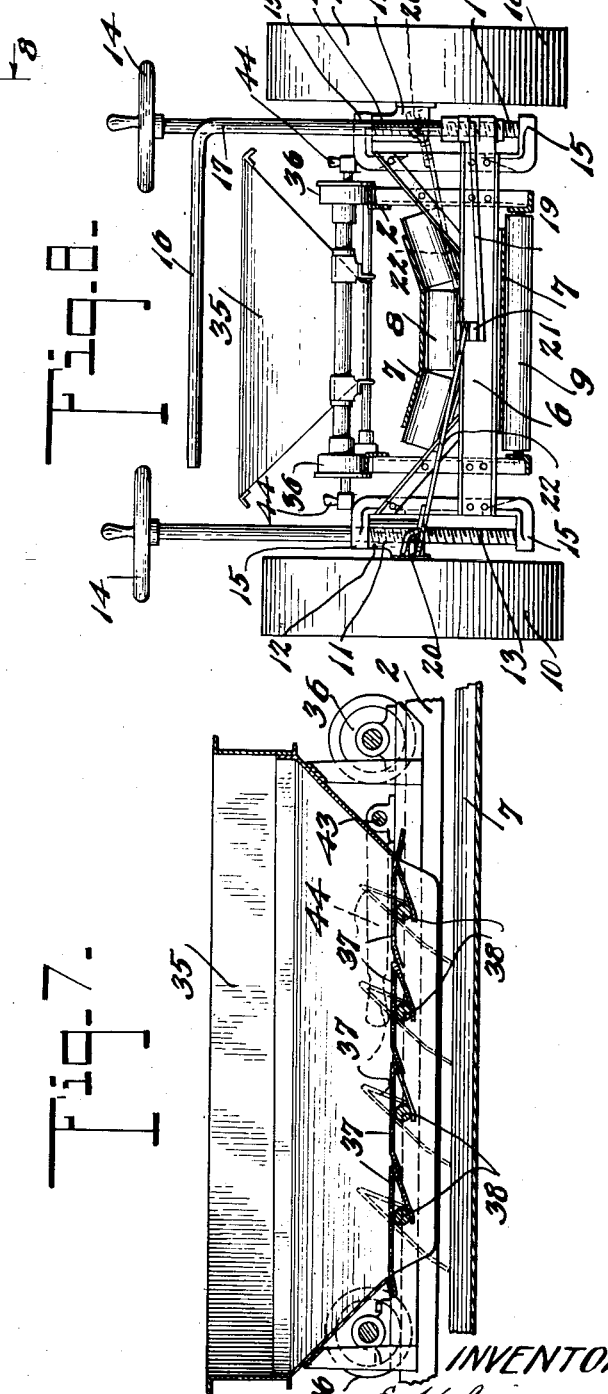
WITNESS:
INVENTOR
E. H. Lichtenberg
BY
ATTORNEYS

UNITED STATES PATENT OFFICE.

ERICH H. LICHTENBERG, OF MILWAUKEE, WISCONSIN, ASSIGNOR TO KOEHRING MACHINE COMPANY, OF MILWAUKEE, WISCONSIN, A CORPORATION.

PORTABLE CONVEYER.

1,273,886.           Specification of Letters Patent.     Patented July 30, 1918.

Application filed March 28, 1918. Serial No. 225,254.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Portable Conveyers, of which the following is a specification.

This invention has to do with labor saving machinery and comprises a novel type of portable loader.

Having regard to the preferred use of the invention it may be stated that the primary object in view in the development of my loading machine has been to design a loader for facilitating the charging of concrete mixing machines with aggregates to be mixed therein. It is well known to-day that the customary method of supplying batches of materials to be mixed in concrete machines requires a number of laborers and necessitates the hauling of the materials more or less distance in wheelbarrows. The wheelbarrows are customarily run up an incline and dumped into a hopper at the mixer or if the mixer has a loading skip the wheelbarrow men dump the barrows directly into the skip which is later operated to carry the material to the mixing drum.

According to my improved loading machine, the materials to be mixed, usually sand and gravel, are dumped upon the ground from the wagons in which they are hauled to the point of use, said materials being dumped to form separate piles. The mixing machine in which the materials are to be mixed will be located adjacent to the piles of materials aforesaid and my loader consists of a long portable truck or frame having a belt conveyer which leads to the mixer to convey the materials to the latter for admixture thereby. I contemplate that the length of my portable machine shall be such as to permit the loader to be readily positioned at one side of at least two piles of the materials to be mixed, and more piles, if desirable, depending upon the degree of spacing. When so disposed and set into operation the endless conveyer of my loader is supplied with measured quantities of the aggregates to be mixed, each of the aggregates being shoveled directly from its pile into a hopper mounted to move lengthwise of the loading machine, and having suitable discharge means enabling a measured quantity of material received therein to be discharged directly upon the conveyer and to be carried off by the latter to the mixer or other point where the materials are to be used.

It is evident, of course, that the loading machine above generally set forth is susceptible of use in other connections than in direct association with a concrete mixer and I contemplate the building of said machine as a unit forming a part of a portable mixing machine, and as a separate unit useful for supplying materials to mixers either stationary or portable, and to other places where materials are desired to be availed of for any of many possible purposes.

The various features of my invention will be more fully understood upon reference to the after-going description, and the annexed drawings, in which:

Figure 1 is a side elevation of a concrete mixing machine equipped with a loader forming a connected unit of said machine and embodying the improvements of this invention.

Figs. 2 and 3 are views similar to Fig. 1 showing a mixing machine of the loading skip type and an associated loader embodying this invention but constructed as a separate portable unit, the two views on Figs. 2 and 3 being practically a single complete view and separated for convenient illustration of the whole loading machine.

Fig. 4 is a side view of the drive mechanism and certain adjusting mechanisms for the loader as contemplated to be used in the type of machines of Figs. 2 and 3.

Fig. 5 is a vertical sectional view bringing out more clearly the features of construction shown in Fig. 4.

Fig. 6 is a similar, enlarged fragmentary view illustrating more fully the measuring hopper adapted to travel along the loader and the raising and lowering means near the rear end of the machine.

Fig. 7 is a vertical longitudinal sectional view through the loading hopper illustrating the form of its discharging means.

Fig. 8 is a vertical sectional view taken about on the line 8—8 of Fig. 6.

Fig. 9 is a plan view showing more clearly the second steering devices.

Referring to Fig. 1 the embodiment of the present invention shown involves the loader A forming a part of the portable concrete mixer B. The loader A comprises a long portable truck or frame 1 preferably constructed of angle iron with spaced sides each made up of upper and lower rails 2 and 3 respectively, crossed brace rods 4 and vertical bars 5 located at intervals throughout the length of the rails 2 and 3. The sides of the frame 1 are suitably connected together by cross beams or bars 6 and the various rails, brace rods, bars and beams aforesaid are fabricated in accordance with well known principles of braced metal construction so as to insure a relatively rigid body for the frame of the loading machine.

As seen best in Figs. 5, 6 and 8 an endless conveying belt 7 is carried by the frame 1 between the sides of the latter and operates at the upper portion thereof over longitudinally spaced series of rollers 8, see Figs. 5 and 8, the rollers of each of these series being preferably arranged at an angle to one another so that the middle longitudinal portion of the belt 7 will belly downward and thus more readily hold the materials deposited thereon to be conveyed thereby. The lower bight of the belt 7 is supported by transverse straight rollers 9 which are journaled at opposite ends upon the lower rails 3 of the sides of the frame 1.

Near its rear end the frame 1 is supported by the ground wheels 10, seen best in Fig. 8, as comprising the stub axles 11 formed with the vertical internally threaded sleeves 12 receiving vertically adjusting screws 13 at the upper ends of which are the hand wheels 14. The screws 13 pass through lateral brackets 15 at the upper and lower portions of each side of the frame 1 and turning of the screws 14 is adapted to raise or lower the frame relatively to the wheels 10 in an obvious manner. In this way the frame 1 of the loader may be raised bodily at its rear end, if desired, or one side raised or lowered to level the frame if the wheels 10 happen to be disposed upon uneven portions of the ground.

Slight turning movement may be imparted to the wheels 10 by the means shown best in Figs. 8 and 9. This means comprises the handle 16 on the vertical shaft 17 suitably journaled upon one side of the frame 1 and provided with the rearwardly extending arm 18. The arm 18 is connected by links 19 with a steering arm 20 on one of the wheels 10 opposite that adjacent to which the shaft 17 is located. Likewise the links 19 are connected intermediate the wheels 10 with a lever 21 and the latter in turn is connected by a link 22 with a steering arm 23 on the wheel 10 adjacent to the shaft 17. These linkage and lever connections are obviously susceptible of shifting the wheels 10 to facilitate turning movement of the loader.

At the rear end of the loader the belt 7 passes about a large supporting roller 24 and at the front end of the loader, the latter is equipped with the inclined beams 25 at the upper end of which is supported a suitably journaled roller 26 about which and other suitable rollers intermediate it and the adjacent end of the loader the belt 7 also passes. By the last mentioned arrangement, the belt 7, however, inclines upward at the end adjacent to the mixer and is adapted to discharge the materials conveyed thereby into a hopper 27 which leads to the drum 28 of the mixer.

I contemplate using any suitable driving means whereby power may be transmitted from the motor or power plant 29 of the mixer B to the conveying belt 7 of the loader. This power transmitting means is generally shown in Fig. 1 as embodying a train of gearing 30 connecting the shaft of the motor 29 with an inclined shaft 31 which in turn is geared to a shaft 32 and a suitable sprocket chain driving means 33 connects the shaft 32 with the shaft 34 on which the roller 26 at the delivery end of the belt 7 is supported. Any suitable gearing may be utilized, however, to transmit motion from the motor of the mixer to the conveyer belt of the loader and I do not wish, therefore, to be limited to the very conventional means which have been illustrated in Fig. 1 of the drawings and which includes a clutch whereby the drive may be temporarily discontinued whenever the loader is not being used.

On the frame 1 of the loader A are mounted the hoppers 35 of which two or more are preferably used, these hoppers being shown best in Figs. 6, 7 and 8, as each comprising a suitable receptacle supported by wheels 36 adapted to travel upon the upper rails 2 of the frame 1, said rails, therefore, forming a track for the hoppers. The hoppers 35 are of the bottom discharge type, being equipped with a plurality of doors 37, each pivotally supported between its ends by a shaft 38 and the shafts adapted to be simultaneously rocked owing to the provision of arms 39 extending therefrom and connected with an actuating bar 40. The bar 40 in turn is connected by a toggle link 41 with a toggle arm 42 rigid on an actuating shaft 43 mounted in suitable bearings at one end of the hopper 35. At one end the shaft 43 projects some distance from the side of the hopper and carries a hand lever 44 susceptible of being grasped in order to actuate the shafts 38 simultaneously whereby to open and close the dumping doors 37 at will. My object in providing a large number of the doors 37 is to distribute the material received in a measured quantity by the hopper 35 over a relatively large area of the conveyer belt 7 when the contents of the hopper are discharged. In this manner I avoid the dumping of the material in a relatively large pile which would offer the disadvantage of resisting somewhat the conveying movement of the belt 7 if the material was not distributed sufficiently to avoid contacting with a next adjacent hopper. Furthermore the liability of spilling of the material off of the belt is likewise eliminated.

With the foregoing understanding of the loading mechanism it is practically self evident that as the concrete mixer B is moved, the same being a portable machine, the loader A is advanced therewith. Furthermore, by operation of the gearing between the power plant of the mixer B and the belt 7 the latter may be caused to operate whenever necessary for use. If the work to be done involves mixing of aggregates for laying pavements, roads, or the like, the materials when hauled to the site of use will be dumped at intervals say in alternate piles of sand and gravel, piles spaced a distance not greater than the length of the loader A. In practical service then it is only necessary to use shovelers, one or more as desired at each pile of the aggregate materials and each shoveler will shovel the materials into one of the hoppers 35 positioned adjacent to the particular pile from which the shoveling takes place. Should the piles be spaced at somewhat varying intervals the hoppers 35 are, of course, adjustable by travel along the loader so as to be placed properly beside the piles of material to be shoveled thereinto. When the workman has filled the hopper as required for the particular batch of aggregates used for the machine, the hopper will be discharged on to the belt 7 and the latter will carry the materials to the mixer in an obvious manner.

Figs. 2 to 5 inclusive illustrate my loading machine as constructed so as to provide a complete loading unit of portable type with self contained power plant enabling movement thereof from place to place where work is to be done, and movement to advance with the work as completed, the latter being primarily necessary where street, pavement or road work is being done. In this type of construction my loader is very like that above described excepting that the front end of the loader is supported by the ground wheels 10ª and a power plant is mounted preferably at this end about where the belt 7 begins its upward inclination seen best in Fig. 2.

Referring to Figs. 2, 4 and 5, C designates the motor by which this type of loader will be moved over the ground and by which its conveyer will be operated. The motor shaft 45 has a spur gear 46 meshing with a larger gear 47 on a drive shaft 48. The shaft 48 is geared to drive the ground wheels 10ª in either of opposite directions by providing the two different clutch devices. One clutch device comprises the clutch element 52 keyed on the shaft 48 and coacting clutch element 53 loose on the said shaft and forming a part of the gear 54. The gear 54 meshes with the gear 55 on the counter shaft 56 suitably journaled in the vertical framework 57 supported by the frame or truck 1 of the loader. The opposite ends of the shaft 56 carry sprocket gears connected by sprocket chains 58 with corresponding gears mounted on the axle of the wheels 10ª. The clutch element 51 is preferably integral with the clutch element 52 and coacts with a second clutch element 59 with which is formed a sprocket gear connected by a sprocket chain 60 with a sprocket gear on the shaft 56. Obviously the clutch elements 51 and 52 are alternatively usable and when the elements 51 and 59 coact the wheels 10ª will be driven in a forward direction directly from the shaft 56 through a drive communicated by the sprocket chain 60. When, however, the clutch elements 52 and 53 are caused to coact the drive from the shaft 48 is communicated to the shaft 56 to operate the latter reversely and reverse or rearward movement of the loader may be thus caused. A lever 61, seen partly in dotted and partly in full lines in Fig. 4 is used to shift the clutch parts 51 and 52 in either of opposite directions to make effective either one of the clutch devices aforesaid and said lever may be supported in any suitable manner on the framework.

It is contemplated to vary the inclination of the upwardly inclined portion of the conveyer belt 7, as seen in Fig. 2, by suitable devices including a shaft 62 at the upper end of the framework 57, with which shaft cables 63 attached to the upper end of the inclined extension of the conveyer belt are connected, seen at 64. On one end of the shaft 62 is a worm wheel 65 engaged by a worm 66 on an inclined operating shaft 67. The shaft 67 is mounted in suitable bearings on the framework 57 and has an operating wheel 68 at its lower end, the turning of which in opposite directions will wind and unwind the cables 63 by proper actuations of the shaft 62, with resultant obvious effect.

The raising and lowering of the front end of the loader is provided for by means shown in Figs. 4 and 5 consisting of an actuating shaft 69 having an operating wheel 70 and a worm 71 engaging a worm wheel 72 on the frame of the loader. The worm wheel 72 is carried by a shaft 73 to which it is fixed and the shaft 73 has arms 74 projecting therefrom and connected by links 75 with the axle 76 of the ground wheels 10ª. The axle 76 is connected by curved standards 77 with a shaft 78. The links 75 and the arms 74 virtually constitute toggle levers intermediate the shaft 73 and the standards 77, whereby on turning the wheels 70 to actuate the shaft 73 the standards 77 may be pulled downward resulting in a raising of the loader frame or body at the front end portion thereof.

In other words, this action would be a downward joint breaking action between the parts 75 and 74 and a reverse action tending to aline these parts would correspondingly lower the body of the loading machine at the particular end referred to.

The drive from the motor C to the belt 7 of the loader of the type now described is effected as seen in Figs. 2 and 4 by a sprocket chain 79 which connects a sprocket gear 80 on the shaft 48 with a sprocket gear at the front extremity of the loader. The sprocket 80 is loose upon the shaft 48 but adapted to be operably connected with the shaft by a clamping wheel 82 which has a threaded connection with one end of the shaft and is seen best in Fig. 5. The operation of the wheel 82 is conventional and well understood in the art and by its use it is evident that the driving of the conveyer belt 7 may be effected or discontinued at will.

Practically all remaining parts of my loader of the self contained power type not otherwise described above are like the corresponding parts of the loader first set forth herein and are designated by the same reference characters and need not under the conditions be set forth again in detail. So far as I am aware a self contained power type portable loader of the construction herein presented has not heretofore been proposed in the art for which reason the claims hereinafter directed to such a loader are intended to cover the machine without inclusion of unimportant detail features presented hereinbefore as parts of a general operating construction.

One of the essential and important advantages of the present invention is that the conveyer mechanism of my loader is susceptible by reason of its continuous operation, of supplying to the mixer or to a loading means for the mixer, the comparatively large quantity of materials required for a batch of aggregates, in a minimum amount of time and with the saving of the expense of a large number of laborers who would be required to wheelbarrow or otherwise convey the materials to the mixer. The extent to which the saving of labor is affected is, therefore, obvious especially when it is borne in mind that owing to the use of the conveyer belt 7 the measured quantities of materials necessary for a batch may be carried on the belt practically at its inclined portion ready to be immediately dumped into the mixer or its loading skip the moment the batch is discharged from the mixing drum or the skip returns to receiving position, as applied to the two types of mixers, respectively. On account of this readiness of use of the loading means the manner in which one man may be relied upon to fill each hopper 35 and accomplish all that a large crew of men could accomplish, owing to the use of the loader, becomes self-evident to those who are versed in the art of handling materials to which the present invention relates.

Having thus described my invention, what I claim as new and desire to secure by Letters Patent is:

1. In a portable loader, the combination of a long low supporting frame, a conveyer mounted to operate lengthwise of said frame, wheels for the frame enabling the same to advance with the work with which the loader is used, a plurality of hoppers on the frame adapted to receive and hold measured quantities of different materials comprising an aggregate to be mixed, said hoppers being so arranged that the materials may be readily shoveled into the same from piles alongside the loader, means associated with the hoppers to discharge materials therefrom into the conveyer to be carried off by the latter, and power means to move the loader and operate the conveyer thereof.

2. In a portable loader, the combination of a long low supporting frame, a conveyer mounted to operate lengthwise of said frame, wheels for the frame enabling the same to advance with the work with which the loader is used, a plurality of hoppers on the frame adapted to receive and hold measured quantities of different materials comprising an aggregate to be mixed, said hoppers being so arranged that the materials may be readily shoveled into the same from piles alongside the loader, means associated with the hoppers to discharge materials therefrom into the conveyer to be carried off by the latter, power means to move the loader and operate the conveyer thereof, one end of the frame with the portion of the conveyer mounted thereon being adjustable to facilitate delivering conveyed materials to variable delivery points, and means for actuating said adjustable frame and conveyer parts.

3. In a loading machine of the class described, a long supporting frame or body, an endless conveyer belt mounted upon said frame, means for driving said belt, a hopper movable along said frame over the belt, and means whereby the contents of the hopper may be discharged on to the belt to be carried off thereby, said discharging means being so constructed that the materials discharged from the hopper on to the belt will be distributed over the belt in a substantially flat pile.

4. In a loading machine of the class described, a long supporting frame or body, an endless conveyer belt mounted upon said frame, means for driving said belt, and a plurality of hoppers mounted to travel on said frame over the belt and each equipped with self contained discharging means whereby its contents may be discharged upon the belt, said discharging means for each hopper comprising a series of dumping doors arranged beneath the major portion of the containing area of each hopper and openable so as to distribute the material contained in the hopper over the conveyer belt in a relatively flat pile.

5. In a loading machine of the class described, a long supporting frame or body, an endless conveyer belt mounted upon said frame, means for driving said belt, a plurality of hoppers mounted to travel on said frame over the belt and each equipped with self contained discharging means whereby its contents may be discharged upon the belt, said discharging means for each hopper comprising a series of dumping doors arranged beneath the major portion of the containing area of each hopper and openable so as to distribute the material contained in the hopper over the conveyer belt in a relatively flat pile, the dumping doors being pivoted at medial points, and an actuating device for opening and closing said doors simultaneously.

6. A loading machine of the class described comprising a low shallow frame or body composed of spaced sides, means supporting said body close to the surface on which it may rest, an endless conveyer belt carried by said body and operating between the sides thereof longitudinally of the body, means for driving said belt, and measuring hoppers mounted to travel longitudinally of the belt and supported by said body.

7. A loading machine of the class described comprising a low shallow frame or body composed of spaced sides, means supporting said body close to the surface on which it may rest, an endless conveyer belt carried by said body and operating between the sides thereof longitudinally of the body, means for driving said belt, measuring hoppers mounted to travel longitudinally of the belt and supported by said body, the upper portions of the sides of the body constituting rails, said hoppers being equipped with wheels to travel along said rails, and dumping means for said hoppers whereby their contents may be discharged directly upon the belt to be conveyed off thereby.

8. A portable loading machine comprising a long narrow supporting frame or truck, supporting wheels for said frame, an endless conveyer belt arranged longitudinally of the frame, means for driving said belt, hoppers mounted upon said frame and comprising measuring receptacles the combined length of which is relatively much less than the length of said frame, and means intermediate said hoppers and the frame to enable the hoppers to be shifted longitudinally of the frame and the belt thereon, each hopper being equipped with discharge means to empty its contents on to the belt.

9. A portable loading machine comprising a long narrow supporting frame or truck, supporting wheels for said frame, an endless conveyer belt arranged longitudinally of the frame, means for driving said belt, hoppers mounted upon said frame and comprising measuring receptacles the combined length of which is relatively much less than the length of said frame, said frame being provided with an inclined extension at one end over which the belt operates whereby the belt is also inclined, and means for raising and lowering said inclined extension and the portion of the belt supported thereby.

10. A portable loading machine comprising a long narrow supporting frame or truck, supporting wheels for said frame, an endless conveyer belt arranged longitudinally of the frame, means for driving said belt, hoppers mounted upon said frame and comprising measuring receptacles the combined length of which is relatively much less than the length of said frame, said frame being provided with an inclined extension at one end over which the belt operates whereby the belt is also inclined, and means for raising and lowering said inclined extension and the portion of the belt supported thereby, a power plant, and means whereby certain of the wheels supporting the frame may be driven from said power plant so as to advance the loading machine at will.

11. A portable loading machine comprising a long low shallow wheeled supporting frame, a conveyer belt operating longitudinally of said frame, means for driving said belt, measuring hoppers supported on the frame over the belt so constructed that materials may be shoveled readily from the ground supporting the machine directly into said hoppers, and means whereby the hoppers may discharge their contents on to the belt.

12. A portable loading machine comprising a long low shallow wheeled supporting frame, a conveyer belt operating longitudinally of said frame, means for driving said belt, measuring hoppers supported on the frame over the belt so constructed that materials may be shoveled readily from the ground supporting the machine directly into said hoppers, means whereby the hoppers may discharge their contents on to the belt, and means whereby the hoppers may be caused to travel longitudinally of the frame over the belt so as to be positioned at variable distances apart or at different points in the length of the belt.

13. A portable loading machine comprising a long low shallow wheeled supporting frame, a conveyer belt operating longitudinally of said frame, measuring hoppers supported on the frame over the belt so constructed that materials may be shoveled readily from the ground supporting the machine directly into said hoppers, means whereby the hoppers may discharge their contents on to the belt, the machine embodying a self contained power plant, and operative connections intermediate the belt and said power plant for driving the belt and intermediate the plant and wheels of the frame for advancing the machine over the ground.

14. A portable loading machine comprising a long low shallow wheeled supporting frame, a conveyer belt operating longitudinally of said frame, means for driving said belt, measuring hoppers supported on the frame over the belt so constructed that materials may be shoveled readily from the ground supporting the machine directly into said hoppers, means whereby the hoppers may discharge their contents on to the belt, means whereby the hoppers are movable longitudinally of the frame over the belt so as to be positioned at variable distances apart or at different points in the length of the belt, and means for raising and lowering the frame relatively to the wheels supporting the same.

In testimony whereof I affix my signature.

ERICH H. LICHTENBERG.